United States Patent
Hood

(10) Patent No.: US 12,327,892 B2
(45) Date of Patent: Jun. 10, 2025

(54) FUEL CELL COOLING

(71) Applicant: Intelligent Energy Limited, Loughborough (GB)

(72) Inventor: Peter David Hood, Loughborough (GB)

( * ) Notice: Subject to any disclaimer, the term of this patent is extended or adjusted under 35 U.S.C. 154(b) by 191 days.

(21) Appl. No.: 18/205,539

(22) Filed: Jun. 4, 2023

(65) Prior Publication Data

US 2023/0317981 A1    Oct. 5, 2023

Related U.S. Application Data

(62) Division of application No. 13/126,969, filed as application No. PCT/GB2009/002560 on Oct. 20, 2009, now abandoned.

(30) Foreign Application Priority Data

Oct. 30, 2008    (GB) ..................................... 0819863

(51) Int. Cl.
| | | |
|---|---|---|
| H01M 8/04029 | (2016.01) | |
| H01M 8/04044 | (2016.01) | |
| H01M 8/04119 | (2016.01) | |
| H01M 8/04291 | (2016.01) | |
| H01M 8/04828 | (2016.01) | |

(Continued)

(52) U.S. Cl.
CPC ... *H01M 8/04029* (2013.01); *H01M 8/04044* (2013.01); *H01M 8/04134* (2013.01); *H01M 8/04141* (2013.01); *H01M 8/04156* (2013.01); *H01M 8/04291* (2013.01);

(Continued)

(58) Field of Classification Search
None
See application file for complete search history.

(56) References Cited

U.S. PATENT DOCUMENTS

| | | | |
|---|---|---|---|
| 4,372,759 A | 2/1983 | Sederquist et al. | |
| 6,238,814 B1 * | 5/2001 | Horiguchi | H01M 8/241 |
| | | | 429/465 |

(Continued)

FOREIGN PATENT DOCUMENTS

| | | |
|---|---|---|
| EP | 1333518 A1 | 8/2003 |
| GB | 2409763 A | 7/2005 |

OTHER PUBLICATIONS

International Patent Application No. PCT/GB2009/002560; Int'l Written Opinion and Search Report; dated Dec. 29, 2009; 13 pages.

*Primary Examiner* — Wyatt P McConnell
(74) *Attorney, Agent, or Firm* — BAKER HOSTETLER, LLP

(57) ABSTRACT

A method of operating a fuel cell system (100) comprising a fuel cell stack (110) and a closed loop water cooling circuit for direct injection of cooling water into the stack (110), the method comprising: measuring an operational parameter of the fuel cell system (100) over a time period; adding an amount of water to the closed loop cooling circuit from the total amount of water generated during operation of the fuel cell stack (110) over the time period; and removing the amount of water from the closed loop cooling circuit generated during operation of the fuel cell stack (110) over the time period is automatically determined by the fuel cell system (100) as a function of the operational parameter.

7 Claims, 1 Drawing Sheet

(51) Int. Cl.
  *H01M 8/0444* (2016.01)
  *H01M 8/04537* (2016.01)
  *H01M 8/10* (2016.01)

(52) U.S. Cl.
  CPC .... *H01M 8/04828* (2013.01); *H01M 8/04485* (2013.01); *H01M 8/04589* (2013.01); *H01M 2008/1095* (2013.01)

(56) References Cited

U.S. PATENT DOCUMENTS

| | | |
|---|---|---|
| 6,584,789 B2 | 7/2003 | Ishikawa |
| 2003/0129465 A1 | 7/2003 | Nakamura et al. |
| 2005/0112430 A1 | 5/2005 | Nuttall et al. |
| 2006/0263653 A1 | 11/2006 | Sinha et al. |
| 2007/0160881 A1* | 7/2007 | Ukai ................ H01M 8/04141 429/429 |

* cited by examiner

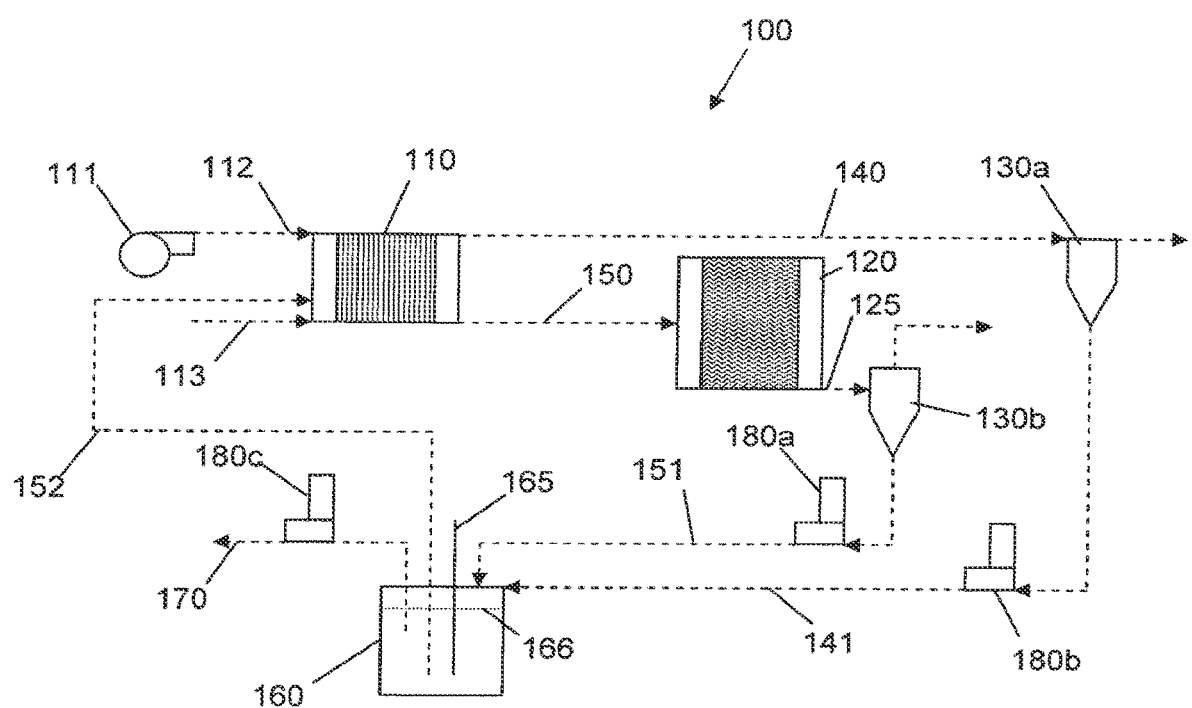

FUEL CELL COOLING

CROSS-REFERENCE TO RELATED APPLICATIONS

This application is a divisional of U.S. Ser. No. 13/126,969, filed Jun. 15, 2011, which is the National Stage Application of International Patent Application No. PCT/GB2009/002560 filed Oct. 20, 2009 the entire contents of each of which are incorporated herein by reference

TECHNICAL FIELD

The invention relates to closed loop cooling of a fuel cell system, and in particular to addition and removal of water within a closed loop cooling circuit in relation to water ejected from a fuel cell stack.

BACKGROUND

Water is integral to the operation of a fuel cell system, for example in the form of the system described herein comprising a fuel cell stack based around a proton exchange membrane (PEM). Reaction of protons (hydrogen ions) conducted through the PEM from an anode flow path, with oxygen present in a cathode flow path, produces water. Excess water needs to be removed from the fuel cell stack to avoid flooding and causing a consequent deterioration in performance. An amount of water, however, needs to be present in at least the cathode flow path to maintain hydration of the PEM, so as to achieve optimum performance of the fuel cell. Managing this water, by deliberate injection and removal, can also provide a useful mechanism for removing excess heat from the fuel cell stack.

To optimise performance, water can be employed deliberately in such fuel cell systems through injection, typically into the cathode flow path of the stack. Such water injection fuel cell systems have potential advantages of reduced size and complexity, as compared with other types of fuel cell systems employing separate cooling channels. Water may be injected directly into the cathode flow path through water distribution manifolds, as for example described in GB2409763.

For water injection systems, it is important that any water fed back into the cathode flow path is of high purity, so as to avoid contamination of the PEM and consequent degradation of stack performance.

For a water injected fuel cell system, in which water for cooling and cell hydration is added directly to the fuel cell membranes, no additional water is added to the system during normal operation. For this to be possible, liquid water is recovered from the exit streams of the fuel cell. The cathode exit stream of the fuel cell is largely a combination of saturated air and liquid water, and the exit stream of the anode is largely a combination of saturated hydrogen and liquid water. The majority of water generated by the fuel cell occurs on the cathode, with a small proportion generated on the anode. If the water is injected onto the cathode of the fuel cell, the majority of the water available for recovery is therefore also on the cathode.

The liquid water content of the cathode exit stream is usually insufficient for the water injection requirements of the fuel cell stack, because the water content of the exhaust is in the form largely of water vapour. The temperature of the exhaust stream is therefore preferably reduced (e.g. using a heat exchanger) so as to reduce the dew point and condense at least part of the vapour to liquid water. A method of separating the liquid water from the stream may also be used (e.g. a cyclonic separator) in order to ensure that the majority of the liquid water available in the stream is captured. Given the relatively low flow rate of the anode exit stream, it is usual to only recover the liquid water content (e.g. via an inline catch pot) as the benefit of additional water available due to reducing the dew point, e.g. by use of a further heat exchanger, is outweighed by the increased system complexity required.

The conductivity of the water introduced into a water injected fuel cell stack must be maintained at a sufficiently low level to avoid corrosion effects. The liquid water leaving the fuel cell stack can contain fluoride and/or corrosion products (e.g. Fe etc.) which increase the conductivity of the water due to an increase in the ions from the total dissolved solids. Also, the conductivity of the water may increase due to any galvanic corrosion reactions that occur as a result of electrical potential difference between components. This can be minimised by careful selection of materials and the overall system design.

An increase in conductivity of the water injected into the fuel cell stack can contaminate the electrocatalyst and membrane leading to an increased resistance and reduced performance. Hence, the conductivity of the water introduced to a water injected fuel cell stack operating in closed loop configuration should be controlled.

One solution is to include an ion exchange column in the fuel cell system to 'polish' the water. However, this can be impractical due to system packaging constraints or service frequency requirements as typically a relatively large unit is required in order to require replacement at similar intervals to other service items (e.g. filters) on the system.

It is an object of the invention to address one or more of the above mentioned problems.

SUMMARY

In accordance with a first aspect of the invention there is provided a method of operating a fuel cell system comprising a fuel cell stack and a closed loop water cooling circuit for direct injection of cooling water into the stack, the method comprising:
- measuring an operational parameter of the fuel cell system over a time period;
- adding an amount of liquid water to the closed loop cooling circuit from a total amount of water generated by the fuel cell stack during operation of the fuel cell stack over the time period; and
- removing the amount of liquid water from the closed loop cooling circuit,
- wherein the amount of liquid water as a proportion of the total amount of water generated during operation of the fuel cell stack over the time period is automatically determined by the fuel cell system as a function of the operational parameter.

By removing the amount of water from the fuel cell stack as a proportion of the total amount of water generated during operation as a function of an operational parameter of the stack, the coolant water in the fuel cell system can be maintained at a desired level of purity dependent on how the fuel cell is operating.

The operational parameter is optionally an electric current drawn from the fuel cell stack over the time period. The proportion of the total amount of water removed from the closed loop cooling circuit may be in proportion with the current drawn over the time period. The amount of water removed and added is then dependent on how hard the fuel cell is working, i.e. how much current is being supplied, which is in direct relation with the amount of fuel used.

The operational parameter may alternatively be the electrical conductivity, pH or total dissolved solids in the water within the closed loop cooling circuit. The proportion of the total amount of water removed from the closed loop cooling circuit may be a function of a difference between a predetermined set point and the operational parameter. These parameters may be used as an additional check to ensure that the quality of coolant water is kept within desired levels.

The amount of water can be determined by controlling an outlet temperature of a heat exchanger in fluid communication with a cathode exhaust line of the fuel cell stack, for example by directing water removed from the closed loop cooling circuit on to an external surface of the heat exchanger. By selectively directing a proportion of water (which may be in the form of vapour) expelled from the stack on to a heat exchanger, additional cooling to convert water vapour into liquid water is only required when more coolant is needed, and when this is not required the excess water, along with much of the heat, can be expelled as vapour.

The amount of water removed from the closed loop cooling circuit may be determined by controlling operation of a pump in fluid communication with the closed loop cooling circuit. The pump may be operated intermittently with a duty cycle proportional to the amount of water to be removed from the cooling circuit. By only operating the pump when needed, the parasitic loads on the fuel cell can be reduced.

The amount of water to be removed may be calculated according to the relationship $$W_r = \beta \frac{In}{2F} \text{ moles } s^{-1}$$

where $W_r$ is the amount of water to be removed from the cooling circuit, I is the current drawn from the fuel cell stack having n cells, F is the Faraday constant and β is a predetermined constant. The constant β is preferably approximately 0.1.

In accordance with a second aspect of the invention, there is provided a fuel cell system comprising a fuel cell stack, a closed loop water cooling circuit for direct injection of cooling water into the stack and a computerised controller, the controller being configured to automatically:
measure an operational parameter of the fuel cell system over a time period;
add an amount of liquid water to the closed loop cooling circuit from the total amount of water generated during operation of the fuel cell stack over the time period; and
remove the amount of liquid water from the closed loop cooling circuit,
wherein the controller is configured to remove the amount of liquid water as a proportion of the total amount of water generated during operation of the fuel cell stack over the time period as a function of the operational parameter.

BRIEF DESCRIPTION OF THE DRAWINGS

The invention will now be described by way of example only and in relation to the accompanying drawing, in which FIG. 1 shows a schematic representation of a fuel cell system for use in accordance with the invention.

The fuel cell system 100, as shown in FIG. 1, comprises at least one fuel cell stack 110 and various connected components for the removal of water such as a heat exchanger 120 and cyclonic water separators 130a, 130b on the anode and cathode exit lines 140, 150 respectively. These components enable liquid water to be recovered from the exit streams. The fluid stream passing through the anode exit line 140 comprises water saturated hydrogen gas and liquid water from the anode volume in the stack 110, while the fluid stream passing through the cathode exit line 150 comprises water saturated air and liquid water from the cathode volume in the stack 110. The cathode exit stream passes into the heat exchanger 120, which is designed to cool the cathode exit stream sufficiently to allow liquid water to be extracted. The extracted liquid water can then be recirculated into the closed loop cooling circuit.

The fuel cell system is configured to capture a proportion of the water discharged into the cathode exhaust line 150 of the fuel cell stack 110 and recycle that proportion for cooling and hydration of the membranes in the fuel cell stack. The proportion is controlled as a fraction of an operational parameter of the fuel cell stack, as further detailed below.

DETAILED DESCRIPTION OF ILLUSTRATIVE EMBODIMENTS

A closed loop cooling circuit in the fuel cell system shown in FIG. 1 can be defined by the fuel cell stack 110, the cathode exit line 150, the heat exchanger 120, the water separator 130b, a cathode water return line 151 leading to a water storage vessel 160 and a water injection line 152 leading back to the fuel cell stack 110. The water injection line 152 preferably leads to the cathode volumes within the stack, where direct cooling can more effectively be achieved. The closed loop circuit may also include the anode exit line 140, water separator 130a and anode water return line 141, also leading to the water storage vessel 160. Pumps 180a, 180b, 180c may be included in the cathode water return line 151, anode water return line 141 and the water removal line 170 respectively, to aid the transport of water around and out of the cooling circuit. A further pump (not shown) is preferably included within the water storage vessel 160 for pumping coolant water through the water injection line 152 into the fuel cell 110.

All the reaction water generated in the fuel cell stack 110 enters the closed loop cooling circuit, but not all of this water is passed on through the cathode water injection inlet line 152.

The water storage vessel 160 preferably comprises a level sensor 165 to determine the level of water 166 within the vessel 160.

The water in the closed loop cooling circuit is controlled according to the cooling and humidification requirements of the fuel cell stack 110, with this typically being calculated in basic form as a function of the fuel cell stack 110 operating current. Excess water from the cooling circuit can be removed from the system through the water removal line by means of the pump 180c.

It is to be understood that references to water throughout the specification are intended to encompass both liquid water and water vapour, unless the context implies or specifies otherwise.

An air compressor 111 is arranged to force air into the cathode volume of the fuel cell stack 110 via a cathode air inlet 112. Fuel, in the form of hydrogen gas, enters the anode volume of the fuel cell stack 110 via an anode inlet line 113.

The exit temperature of the stream leaving the heat exchanger exit port 125 is controlled such that sufficient liquid water is recovered to allow a suitable level 166 within the water storage vessel 160 to be maintained. Typically, a setpoint of 85% full is chosen for the level 166 in the water storage vessel 160, with the remaining 15% used as a buffer to allow for hysteresis due to the thermal inertia of the heat exchanger 120. An amount of liquid water is therefore allowed to flow through the cathode water return line 151 into the water storage vessel, according to the chosen setpoint. Control of the system 100 is preferably set such that the level 166 of water within the water storage vessel 160 is maintained irrespective of the water leaving the vessel through the water removal line 170. However, if a setpoint level of, for example, 95% is chosen, the thermal hysteresis as the heat exchanger cooling is reduced may be such that additional water will need be removed from the water storage vessel 160. If the thermal characteristics of the heat exchanger 120 are known (either via calculation or empirical methods), the amount of water removed from the water storage vessel 160 due to the overflow would also be known. Hence, it is possible to control the heat exchanger cooling such that a required amount of water is removed from the water storage vessel 160.

A more accurate means of removing liquid water from the storage vessel is by use of a pump 180c. Such a pump may be either continually variable or of fixed operation. If the pump 180c is continually variable according to a setpoint, the flow rate as a function of setpoint is obtained with the pump 180c providing liquid to the atmosphere via the water removal line 170. Thus, this data can be used to achieve a required flow rate by adjusting the setpoint accordingly. With a fixed operation pump, the flow rate of the pump is calibrated with it pumping water to atmosphere. This flow rate is thus the maximum that can be achieved. If a flow rate below this maximum is required, the pump 180c can be switched on and off, according to a suitable duty cycle. Typically, over a given time period, the pump 180c will operate for a percentage of this time according to the ratio of the required flow rate to the maximum. For example, if the pump 180c is calibrated to deliver 100 ml/min, and a flow rate of 25 ml/min is required, then the pump is switched on for 15 seconds, and then off for 45 seconds, with this cycle repeated every 60 seconds. As well as increased accuracy, the use of a pump 180c to remove the water has an additional benefit when the fuel cell system 100 comprises an air cooled heat exchanger 120. In this situation, the excess water from the water removal line 170 may be sprayed onto the heat exchanger 120 to aid cooling, and thus allow the heat exchanger 120 to be smaller than would otherwise be required to generate the liquid water for replenishing the cooling circuit.

The amount of liquid water that should be added and removed from the closed loop system can be calculated as a function of the total amount of water generated due to the electrochemical reaction in the fuel cell stack 110. This can be calculated as follows.

Water production, $$W_p = \frac{In}{2F} \text{ moles } s^{-1},$$

where I is the fuel cell stack current (in Amps), n is the number of cells in the fuel cell stack 110, and F is the Faraday constant (approximately 96.5×10³ Coulombs per mole). The above relationship assumes a stack of fuel cells arranged electrically in series with each other, where the same current passes through each cell.

The relative molecular mass of water is 18.0 g mole⁻¹, and the density of water is 0.998 g cm⁻³ at 20° C., hence:

Water production, $$W_p = \frac{In}{2F} \times 60 \times 18.1 \text{ ml min}^{-1}$$

The amount of liquid water to be removed from the cooling circuit, $W_r$, can be expressed as, $$W_r = \beta \frac{In}{2F} \text{ moles } s^{-1} = \beta \frac{In}{2F} \times 60 \times 18.1 \text{ ml min}^{-1}$$

or $$W_r = \beta W_p$$

where β is the proportion of liquid water to be removed, as compared to the total amount of water generated by the fuel cell stack 110.

A preferred value for β is 0.1 as this provides an acceptable balance between heat exchanger size and dilution of the liquid water within the closed loop, although this value can be varied according to requirements. In general, the amount of water to be removed for any given size of fuel cell can be described as being directly proportional to the fuel cell stack current.

An alternative to the above approach is to measure the conductivity or other operational parameter (e.g. pH, total dissolved solids, etc.) of the liquid water entering the fuel cell stack 110. The amount of water to be removed from the system, and therefore the amount of liquid water to be drawn from the cathode exit line 150, can be derived as a function of a calculated error between a setpoint of conductivity or other parameter and the measured value. A standard control loop (e.g. proportional, integral, derivative: PID) could be used for this purpose, with the control loop being set to allow for thermal inertia of the heat exchanger 120.

The fuel cell system preferably comprises a suitable computerised controller connected to the various relevant components of the fuel cell system 100. The controller is configured to automatically determine the amount of water to be removed from the closed loop cooling circuit as a function of a particular operational parameter. For example, the controller can be configured to monitor the current drawn from the stack 110, determine from this measurement the amount of water to be removed from the closed loop cooling circuit, and adjust operation of the pumps 180a, 180b, 180c accordingly. The controller may be configured to control operation of the water separators 130a, 130b, and the amount of water (if any) to be sprayed on to the heat exchanger 120 for additional cooling.

The controller may be configured to monitor operational parameters such as water conductivity, pH or dissolved solids, and adjust the amount of liquid water removed from the cooling circuit accordingly. For example, if the conductivity of the liquid water within the cooling circuit rises, the controller may be configured to increase the amount of liquid water removed from and added to the cooling circuit, so as to dilute the cooling water with fresh water generated in the fuel cell stack 110, and thereby reduce the conductivity of water in the cooling circuit.

Other embodiments are intentionally within the scope of the invention as defined by the appended claims.

What is claimed:

1. A method of operating a fuel cell system (100) comprising a fuel cell stack (110) and a closed loop water cooling circuit for direct injection of cooling water into the stack (110), the method comprising:

measuring an operational parameter of the fuel cell system (100) over a time period;

adding an amount of liquid water to the closed loop cooling circuit from a total amount of water generated by the fuel cell stack (110) during operation of the fuel cell stack (110) over the time period; and characterized by removing the amount of liquid water from the closed loop cooling circuit, wherein the amount of liquid water as a proportion of the total amount of water generated during operation of the fuel cell stack (110) over the time period is automatically determined by the fuel cell system as a function of the operational parameter, wherein the operational parameter is an electric current drawn from the fuel cell stack (110) over the time period.

2. The method of claim 1 wherein the proportion of the total amount of water removed from the closed loop cooling circuit is in proportion with the current drawn over the time period.

3. The method of claim 1 comprising controlling an outlet temperature of a heat exchanger (120) in fluid communication with a cathode exhaust line (150) of the fuel cell stack (100) by directing water removed from the closed loop cooling circuit on to an external surface of the heat exchanger (120).

4. The method of claim 1 wherein the amount of water removed from the closed loop cooling circuit is determined by controlling operation of a pump (180*a-c*) in fluid communication with the closed loop cooling circuit.

5. The method of claim 4 wherein the pump (180*a-c*) is operated intermittently with a duty cycle proportional to the amount of water to be removed from the cooling circuit.

6. The method of claim 1 wherein the amount of water is calculated according to the relationship $$W_r = \beta \frac{In}{2F} \text{ moles } s^{-1}$$

where Wr is the amount of water to be removed from the cooling circuit, l is the current drawn from the fuel cell stack (110) having n cells, F is the Faraday constant and β is a predetermined constant.

7. The method of claim 6 in which β is approximately 0.1.

* * * * *